L. GROGNOT.
PROCESS FOR THE MANUFACTURE OF RESINOUS PRODUCTS CAPABLE OF REPLACING NATURAL RESINS.
APPLICATION FILED SEPT. 5, 1907.
906,219. Patented Dec. 8, 1908.
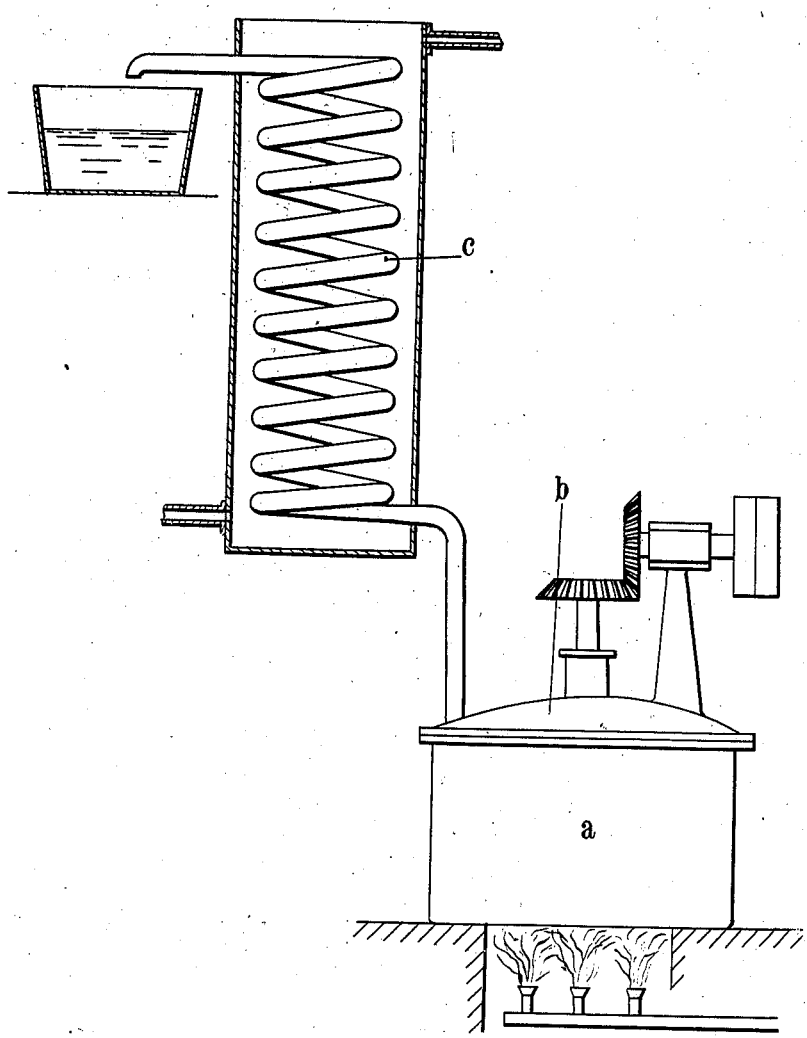

UNITED STATES PATENT OFFICE.

LÉON GROGNOT, OF PARIS, FRANCE, ASSIGNOR TO SOCIÉTÉ DITE: LES PRODUITS CHIMIQUES DE CROISSY LIMITED, OF PARIS, FRANCE, A FIRM.

PROCESS FOR THE MANUFACTURE OF RESINOUS PRODUCTS CAPABLE OF REPLACING NATURAL RESINS.

No. 906,219.　　Specification of Letters Patent.　　Patented Dec. 8, 1908.

Application filed September 5, 1907. Serial No. 391,436.

*To all whom it may concern:*

Be it known that I, LÉON GROGNOT, a citizen of the French Republic, residing at 18 Rue Labat, Paris, France, chemist, have invented certain new and useful Improvements in and Relating to Processes for the Manufacture of Resinous Products Capable of Replacing Natural Resins, of which the following is a specification.

This invention has for its object a process for the manufacture of resinous products capable of replacing natural resins, such as gum-lac, succin, copal or others.

It is known that the phenols have the property of combining with the aldehydes under the influence of catalytic agents (such as mineral or organic acids, alkaline or other bases) for forming various resins analogous to the natural resins in their properties. Nevertheless the action of these catalytic agents is difficult to control and goes beyond what is required. The present process permits of obviating this defect.

The accompanying drawing, which is given by way of example, illustrates a constructional form of an apparatus by means of which the process may be carried into practice for obtaining a resinous product analogous to gum-lac.

The process forming the object of this invention consists broadly in first of all combining the aldehyde with an intermediate agent or determinant such as a glycerin, under the influence of heat, and of a catalytic agent such as hydrochloric acid; then in adding a phenol which regenerates the glycerin by a second reaction presenting no violence, and gives a thick oil which is treated by washings, dehydration and moderate heating, the resinous product being finally obtained.

In order to obtain a product analogous to gum-lac for example, the following is the preferred method:—In an enameled cast iron vessel *a* there are mixed: 200 kgs. of glycerin with 200 kgs. of formic aldehyde, then 30 to 40 kgs. of hydrochloric acid at 21 or 22° Baumé. The whole is heated by means of an appropriate source of heat until slight ebullition occurs; this continues of itself without fire, owing to the combination of the glycerin with the aldehyde. At the end of the reaction the heat is again maintained for one or two hours, avoiding vigorous boiling.

It is desirable to provide the vessel with a cover *b* and to direct the vapors into a cooled ascending coil *c* in order to prevent the loss of any substance which may be carried along. Cooling to about 80° C. is then allowed to take place and about 200 kgs. of white phenic acid of a high standard is then added to the mass. After mixing and without heating a reaction is produced with slight ebullition which continues for a certain period. After this a thick oil is formed above a glycerinous liquid. This latter is separated, the oil is washed several times in boiling water and after final separation it is dehydrated by heat, kneading it in the neighborhood of 100° C., either in the atmosphere or *in vacuo*. Finally, the oil is heated to approximately 150° C. and maintained about this temperature until a test quantity withdrawn indicates that the cooled resin is hard and brilliant. The resin may then be cast into thin sheets, beads or sticks, as desired.

The process presents the advantage of rendering the operation uniform and of avoiding any violent reaction which might give rise to useless accessory products or products which would be harmful to the products that it is sought to obtain. The glycerin contained in the washing waters may be evaporated and regenerated so as to serve again.

In place of formic aldehyde any other aldehyde or substance fulfilling the same function may be employed; similarly the glycerin and the phenol may be replaced by bodies of any kind of the corresponding series or fulfilling the same functions. It is also possible to add to the resinous substance, before casting it, suitable proportions of vegetable or animal wax and gluten to impart to the gum-lac or other resin all the properties of ordinary lac.

The process serves for the manufacture of resinous products suited for replacing resins of all kinds.

Having now particularly described and ascertained the nature of my said invention and in what manner the same is to be performed, I declare that what I claim is:—

1. A process for the manufacture of resinous products by the action of phenols on aldehydes, consisting in first combining the aldehyde with an intermediary substance, the reaction being facilitated by the addition of a catalytic agent which merely acts by its presence, and then causing the phenol to decompose the combination of the aldehyde and the intermediary substance and to regenerate the latter.

2. A process for the manufacture of resinous products consisting in combining an aldehyde with intermediary substances under the influence of heat and of a catalytic agent, regenerating the intermediary substances by the action of a phenol and producing a combination of said phenol with the aldehyde, in the form of an oil which is washed and dehydrated by heating.

3. A process for the manufacture of resinous products consisting in combining an aldehyde with glycerin under the influence of heat and of hydrochloric acid, attacking said combination by a phenol thus liberating the glycerin and forming an oily compound of phenol and aldehyde, and treating said oily compound by washing and heating.

4. A method of obtaining a resin analogous to gum-lac consisting in combining formic aldehyde with glycerin, the reaction being facilitated by the presence of hydrochloric acid, and then causing phenic acid to act on the combination of formic aldehyde and glycerin, thus regenerating the glycerin and combining with the aldehyde in the shape of a thick oil.

5. A method of obtaining a product analogous to gum-lac, consisting in combining formic aldehyde with glycerin in the presence of a small quantity of hydrochloric acid at 21° or 22° Baumé, in heating to the point of slight ebullition, adding phenic acid after the mass has been allowed to cool to about 80° C., then separating the thick oil formed from the regenerating glycerin, and condensing said oil to a hard matter by heating.

6. A method of obtaining a product analogous to gum-lac consisting in combining equal proportions of formic aldehyde and glycerin in the presence of a small quantity of hydrochloric acid, heating to the point of slight ebullition, allowing the mass to cool to about 80° C., then adding at once phenic acid equal in proportion to the foregoing two substances, separating from the regenerated glycerin the thick oil formed, which is dehydrated by heating to about 100° C., and which is condensed to a hard consistency in heating it to about 150° C.

In testimony whereof I have hereunto placed my hand at Paris, France, this 21st day of August 1907.

LÉON GROGNOT.

In the presence of two witnesses:
CH. DE LAVIGEI,
HENRY SCHWAB.